(12) United States Patent
Hasegawa

(10) Patent No.: US 7,160,837 B2
(45) Date of Patent: *Jan. 9, 2007

(54) MIXED CONDUCTOR AND MIXED CONDUCTOR PRODUCING METHOD

(75) Inventor: Norifumi Hasegawa, Sappro (JP)

(73) Assignee: KabushikiKaisha Equos Research, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,974

(22) Filed: Sep. 23, 2003

(65) Prior Publication Data

US 2004/0227129 A1 Nov. 18, 2004

(30) Foreign Application Priority Data

May 16, 2003 (JP) ............................. 2003-139431
Jun. 5, 2003 (JP) ............................. 2003-160342

(51) Int. Cl.
*B01J 21/18* (2006.01)
*H01B 1/00* (2006.01)
*H01B 1/04* (2006.01)
*H01M 8/10* (2006.01)
*H01M 4/70* (2006.01)

(52) U.S. Cl. .................. 502/180; 252/500; 252/502; 252/510; 252/511; 429/30; 429/33; 429/239.1; 429/231.95; 429/231.1; 429/232; 423/447 R; 423/448; 423/449.1; 423/449.6

(58) Field of Classification Search .............. 502/180; 252/500, 502, 510, 511; 429/30, 33, 239.1, 429/231.95, 231.1, 232; 423/447 R, 448, 423/449.1, 449.6

See application file for complete search history.

(56) References Cited

U.S. PATENT DOCUMENTS

| | | | | | |
|---|---|---|---|---|---|
| 4,642,664 | A | * | 2/1987 | Goldberg et al. | 257/1 |
| 4,725,422 | A | * | 2/1988 | Miyabayashi et al. | 423/445 R |
| 4,731,705 | A | * | 3/1988 | Velasco et al. | 361/502 |
| 4,804,592 | A | * | 2/1989 | Vanderborgh et al. | 429/33 |
| 4,911,803 | A | * | 3/1990 | Kunz | 205/764 |
| 5,350,643 | A | * | 9/1994 | Imahashi et al. | 429/33 |
| 5,573,648 | A | * | 11/1996 | Shen et al. | 204/412 |
| 5,821,185 | A | * | 10/1998 | White et al. | 502/4 |
| 6,187,157 | B1 | * | 2/2001 | Chen et al. | 204/296 |
| 6,352,797 | B1 | * | 3/2002 | Yoshida et al. | 429/313 |
| 2002/0110725 | A1 | | 8/2002 | Yamaura et al. | 429/44 |
| 2002/0192538 | A1 | * | 12/2002 | Tanahashi et al. | 429/44 |
| 2003/0022055 | A1 | * | 1/2003 | Menashi | 429/44 |
| 2004/0096720 | A1 | * | 5/2004 | Poling et al. | 429/33 |
| 2005/0104045 | A1 | * | 5/2005 | Hasegawa | 252/500 |

FOREIGN PATENT DOCUMENTS

| | | |
|---|---|---|
| JP | 10-255832 | 9/1998 |
| JP | 11-335165 | 12/1999 |
| JP | 2000-188117 | 7/2000 |
| JP | 2000-251533 | 9/2000 |
| JP | 2001-110428 | 4/2001 |
| JP | 2001-202971 | 7/2001 |
| JP | 2002-536787 | 10/2002 |

(Continued)

*Primary Examiner*—J. A. Lorengo
*Assistant Examiner*—Patricia L. Hailey
(74) *Attorney, Agent, or Firm*—Bacon & Thomas, PLLC

(57) ABSTRACT

The mixed conductor of the invention includes an electron conductor made of a carbon-based inorganic material with a main chain having a π bond for conduction of electrons, and a proton conductor made of an inorganic material, wherein the electron conductor and the proton conductor are attached to each other by at least one of covalent bonding, intercalation, and inclusion.

29 Claims, 6 Drawing Sheets

| | FOREIGN PATENT DOCUMENTS | | WO | 00/45447 | 3/2000 |
|---|---|---|---|---|---|
| JP | 2003-68321 | 3/2003 | | | |
| JP | 2003-100316 | 4/2003 | * cited by examiner | | |

MIXED CONDUCTOR AND MIXED CONDUCTOR PRODUCING METHOD

BACKGROUND OF THE INVENTION

1. Field of the Invention

The present invention relates to a mixed conductor which exhibits both electron conduction and proton conduction. This mixed conductor can be used for the catalyst layer of a fuel cell, a gas diffusion catalyst and the like.

2. Description of the Related Art

The catalyst layer of a fuel cell is formed between a proton exchange membrane and a backing layer and supports a catalyst for accelerating an electrochemical reaction. The catalyst layer constitutes the electrodes of the fuel cell. In the catalyst layer on an air cathode side, for example, protons passing through the proton exchange membrane and electrons transferred to the air cathode are conducted to the catalyst, thus binding oxygen and protons diffused onto the catalyst. Thus, the catalyst layer needs to exhibit both proton conduction and electron conduction in order to reduce the transfer loss of oxygen, protons and electrons. To this end, a mixture of a poly electrolyte having catalysts supported on surfaces such as carbon particles (exhibiting electron conduction) and Nafion (trade name, manufactured by E.I du Pont de Nemours) which exhibits ionic conduction is used in the fuel cell.

However, if a material having ionic conduction and a material having electron conduction are used together, it is difficult to mix them completely uniformly. As a result, protons and electrons cannot be uniformly transferred to all catalyst particles.

To solve this disadvantage, there has been proposed a mixed conductor which exhibits both ionic conduction and electron conduction using one material.

For example, organic mixed conductors are disclosed in the following patent documents 1 to 4.

Patent Document 1: Japanese Unexamined Patent Publication No. 2001-202971

Patent Document 2: Japanese Unexamined Patent Publication No. 2001-110428

Patent Document 3: Japanese Unexamined Patent Publication No. 2003-68321

Patent Document 4: Japanese Patent Application National Publication (Laid-Open) No. 2002-536787

In addition, inorganic mixed conductors conducting electrons and oxygen ions are disclosed in the following patent documents 5 to 8.

Patent Document 5: Japanese Unexamined Patent Publication No. (10)1998-255832

Patent Document 6: Japanese Unexamined Patent Publication No. (11)1999-335165

Patent Document 7: Japanese Unexamined Patent Publication No. 2000-251533

Patent Document 8: Japanese Unexamined Patent Publication No. 2000-18811

Since the organic mixed conductors are made of organic materials, they have many problems in terms of durability and heat resistance to be solved before being put to practical use.

Inorganic mixed conductors which transfer electrons and oxygen ions have high operating temperatures and therefore are inappropriate for small-sized fuel cells suitable for use in, for example, vehicles and cellular phones.

SUMMARY OF THE INVENTION

In order to solve the foregoing problems, the present invention provides a mixed conductor in the form of an electron conductor made of an inorganic material fixed to a proton conductor made of an inorganic material so as not to dissolve in water.

The inorganic electron conductor may be a type with a main chain having a carbon—carbon double bond and/or a carbon—carbon triple bond, the main chain contributing to the electron conduction function as shown in FIGS. 1 and 2. Alternatively, the inorganic electron may be a type which transfers electrons through a side chain.

The preferred inorganic electron conductor is obtained by carbonizing at least one organic compound having a $\pi$ bond. Examples of organic compounds having a $\pi$ bond include aliphatic hydrocarbons, aromatic hydrocarbons and derivatives of aliphatic hydrocarbons and aromatic hydrocarbons. Typical examples of such organic compounds include polyacetylene, resorcinol, phenol, phenylphenol, polyaniline, polypyrrole, polythiophene, phenylphosphonic acid, and phenylsilane alkoxide.

Further, the inorganic electron conductor can be a carbonaceous material, such as graphite or a carbon nanotube, or a metallic material containing a metal such as gold, palladium, platinum, magnesium, lithium or titanium, or an alloy thereof.

The inorganic proton conductor is made of at least one of a phosphorus-containing compound, a sulfur-containing compound, carbonic acid, boric acid, and inorganic solid-state acid. More preferably, at least one of a phosphorus-containing compound, phosphoric acid, phosphoric acid esters, sulfuric acid, sulfuric acid esters, tungsten oxide hydroxide, rhenium oxide hydroxide, silicon oxide, tin oxide, zirconia oxide, tungstophosphoric acid, and tungstosilicic acid.

According to the present invention, the inorganic electron conductor and the inorganic proton conductor are fixed to each other so as not to dissolve in water. They may be fixed by covalent bonding, intercalation or inclusion. However, depending on production process conditions, these types of fixing may be combined.

Further, choice of covalent bonding, intercalation or inclusion is made according to the types of the materials of the electron conductor and the proton conductor. For example, if the electron conductor is an inorganic material obtained by carbonizing an organic material, the fixing may be mainly covalent bonding. If the electron conductor is made of a metallic material and an inorganic material, especially an oxide, is selected as the material for the proton conductor, for example, the both conductors can be fixed to each other by covalent bonding or inclusion.

The state in which the electron conductors and the proton conductors are fixed to each other by covalent bonding is illustrated in FIGS. 1 and 2. Since the electron conductors 1 or 3 and the proton conductors 2 bound by covalent bonding are arranged in close proximity, both the electron conductors and the proton conductors can contact a catalyst particle (e.g., platinum) in nano order as shown. Accordingly, it is possible to supply electrons and protons necessary for a catalytic reaction to the catalyst in proper quantities.

Such a mixed conductor is formed as follows.

First, a precursor obtained by dispersing a proton conductor in a polymer of an organic compound having a $\pi$ bond is prepared.

The precursor having a proton conductor dispersed in the polymer of an organic compound, or the precursor having both a proton conductor bound to an organic compound that constitutes the electron conductor by a covalent bond and a proton conductor separated from the former proton conductor and substantially in a dispersed state.

Further a high molecular weight precursor may be formed by polymerizing an organic compound having a π bond with a proton conducting material. It is believed that in this high molecular weight polymer precursor the carbons of the organic compound are polymerized with one another to form an electron conducting main chain having a π bond and also form a covalent bond with the proton conductor, and that this proton conductor bridges the carbon main chain of the electron conductor. By adding the proton conductor in a sufficient quantity, the distance between the proton conductors bound to the carbon main chain by covalent bonds is narrowed, and proton conduction is generated between the proton conductors. It has been experimentally shown that putting the polymer precursor into solution with hydrolytic cleavage at 100 to 200 for several hours promotes formation of covalent bonds between the electron conducting main chain and the proton conductor, thereby improving proton conductivity and preventing release of the proton conductor from the polymer precursor.

This precursor is subjected to pyrolysis in an inert atmosphere. As a result, the organic compound is converted into an inorganic material by carbonization, thereby ensuring electron conduction.

Because the proton conductor is stably fixed to the electron conducting carbon skeletons, proton conduction is ensured. It is believed that the proton conduction is attained by arranging proton conductors proximate each other. As shown in FIGS. 1 and 2, if the proton conductors bridge the carbon skeletons, the positions of the proton conductors are fixed, thereby ensuring the proton conduction by the interaction between the proton conductors.

If the proton conductors are released from the carbon skeletons or if the proton conductors are not bound to the carbon skeletons from the precursor, then the proton conductors are believed to be intercalated into the carbon main chain or included in a mesh structure formed by the carbon main chain. In any case, the proton conduction can be ensured provided the proton conductors are in close proximity.

Since the proton conductors are bound, intercalated or included between the carbon skeletons, the proton conductor does not float. Therefore, even if the mixed conductor is used at a location where water is present, the proton conductor is not influenced by the water. That is, the loss of proton conduction in the presence of water is very low.

Organic compounds having a π bond include unsaturated aliphatic hydrocarbons and aromatic hydrocarbons. More preferably, at least one of polyacetylene, resorcinol, phenol, phenylphenol, polyaniline, polypyrrole, polythiophene, phenylphosphonic acid, and phenylsilane alkoxide is selected as a material for the organic compound having a π bond.

Further examples of the proton conducting material includephosphorus-containing compounds, sulfur-containing compounds, carbonic acid, boric acid, and inorganic solid-state acids. An example of the phosphorus-containing compound is phosphoric acid and examples of the sulfur-containing compound include sulfuric acid and sulfonic acid. Further, an inorganic proton conducting material can be produced using a derivative of one of these compounds as a starting material. Preferably, at least one of a phosphorus-containing compound, phosphoric acid, phosphate ester, sulfuric acid, sulfate ester, tungsten oxide hydroxide, rhenium oxide hydroxide, silicon oxide, tin oxide, zirconia oxide, tungstophosphoric acid, and tungstosilicic acid is used.

To mineralize the organic compound in the precursor, it is preferable that the precursor be pyrolized in an inert atmosphere.

The inert atmosphere can be attained by putting the precursor in an atmosphere of nitrogen gas or helium gas or in vacuum.

If the precursor is subjected to pyrolysis in such an inert atmosphere, the organic component of the precursor is carbonized and thereby converted into an inorganic material. If the main chain of the organic component has a π bond, high electron conduction is ensured.

Heating temperature and heating time are appropriately selected according to the characteristics of the precursor.

Simultaneously with or after heating, high energy can be applied to the precursor. Examples of the high energy radiation include plasma radiation, microwave radiation and ultrasonic radiation.

As described above, the mixed conductor according to the present invention is made of inorganic materials and exhibits both an electron conducting function and a proton conducting function. In addition, even in a low temperature range close to room temperature, the mixed conductor functions properly. Further, even if water is present, the mixed conductor exhibits both electron conduction and proton conduction.

DETAILED DESCRIPTION OF THE PREFERRED EMBODIMENTS

The above-stated advantages of the mixed conductor according to the present invention are confirmed by the examples which follow.

First, a method for producing a mixed conductor will be described with reference to the following chemical formula 1, as well as FIG. 3.

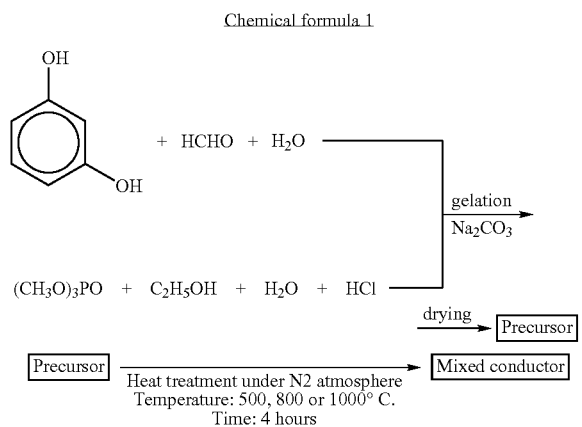

Chemical formula 1

Resorcinol (10 g) and formaldehyde (13 ml) are dissolved in water (40 ml), and a solution obtained by hydrolyzing trimethyl phosphate is added. The solution is then subjected to reflux at 100 to 200 for four hours and covalent bonding between electron conductors and proton conductors in the solution is promoted. The resultant solution is dehydrated and condensed with $Na_2CO_3$ as a catalyst to gelate the solution. This gel is dried at 120° C., thereby obtaining a precursor.

Figure 1:
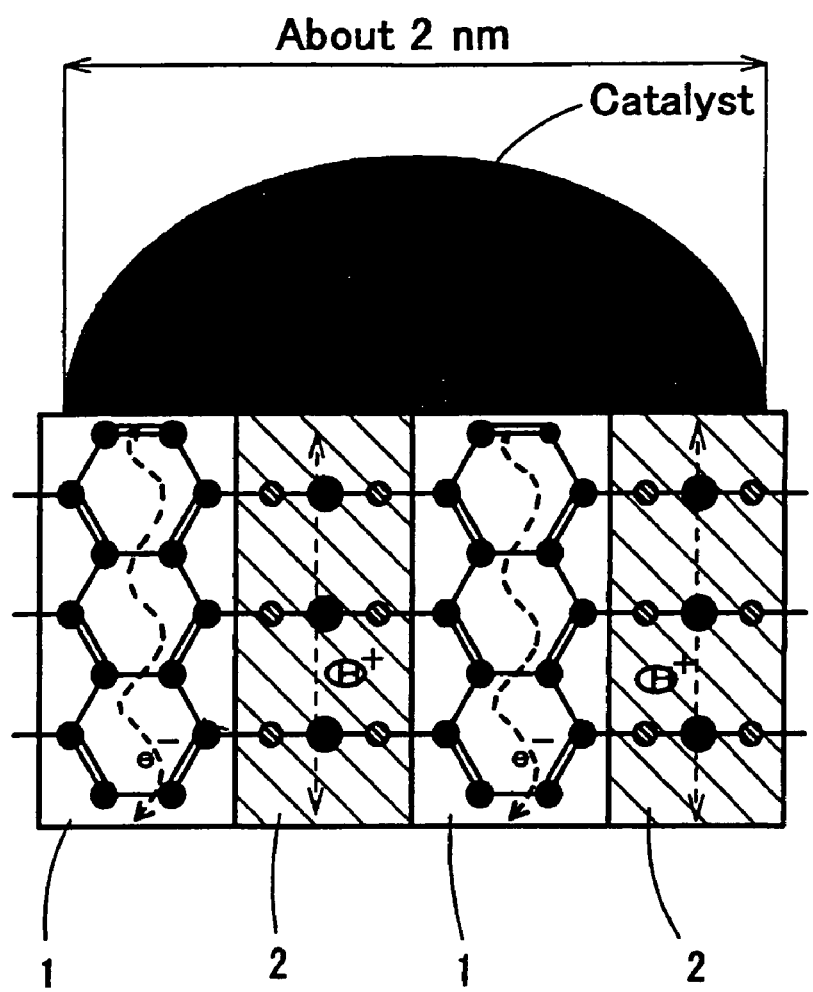
FIG. 1 is a schematic representation of the structure of a mixed conductor according to the present invention.
Figure 2:
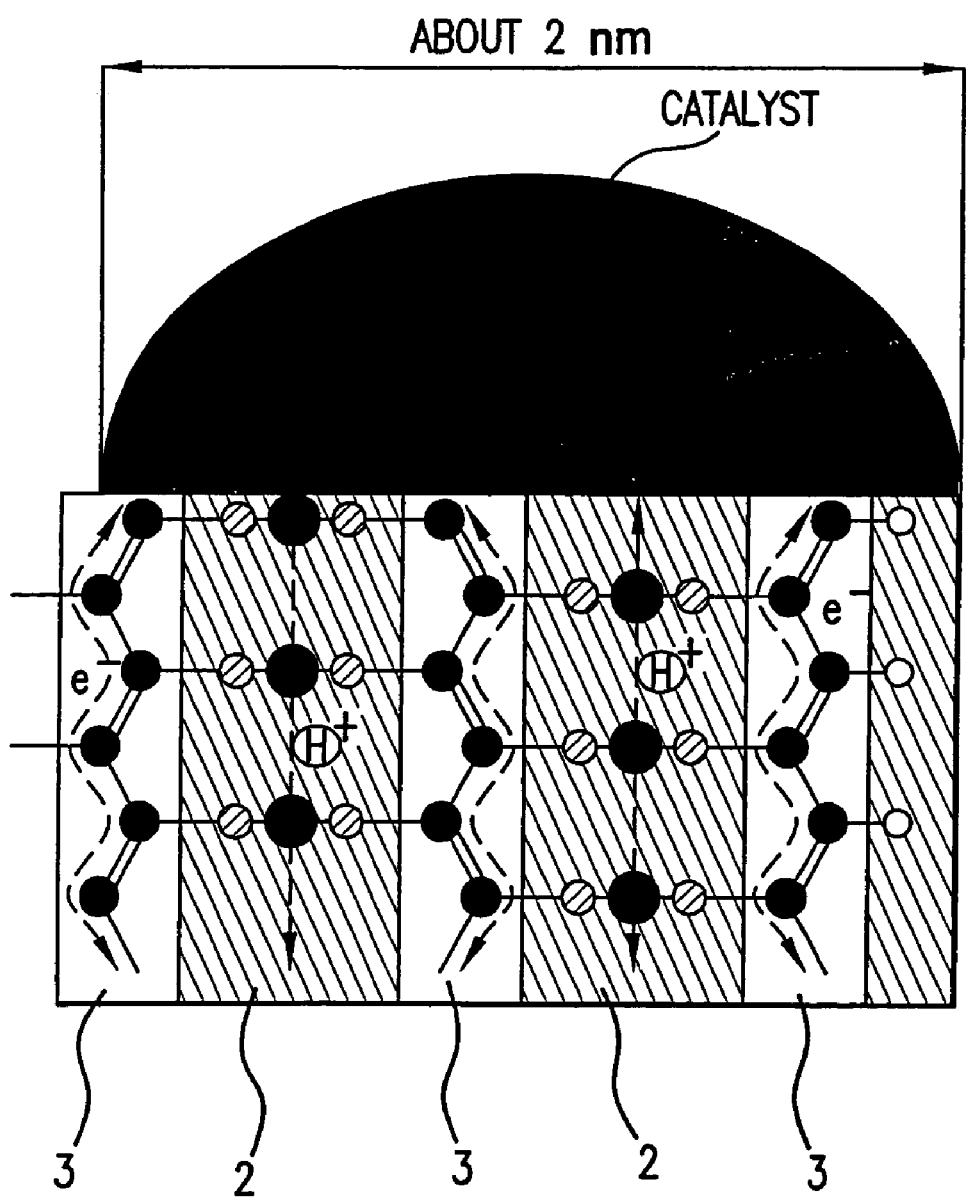
FIG. 2 is a schematic representation of the structure of another mixed conductor according to the present invention.
Figure 3:
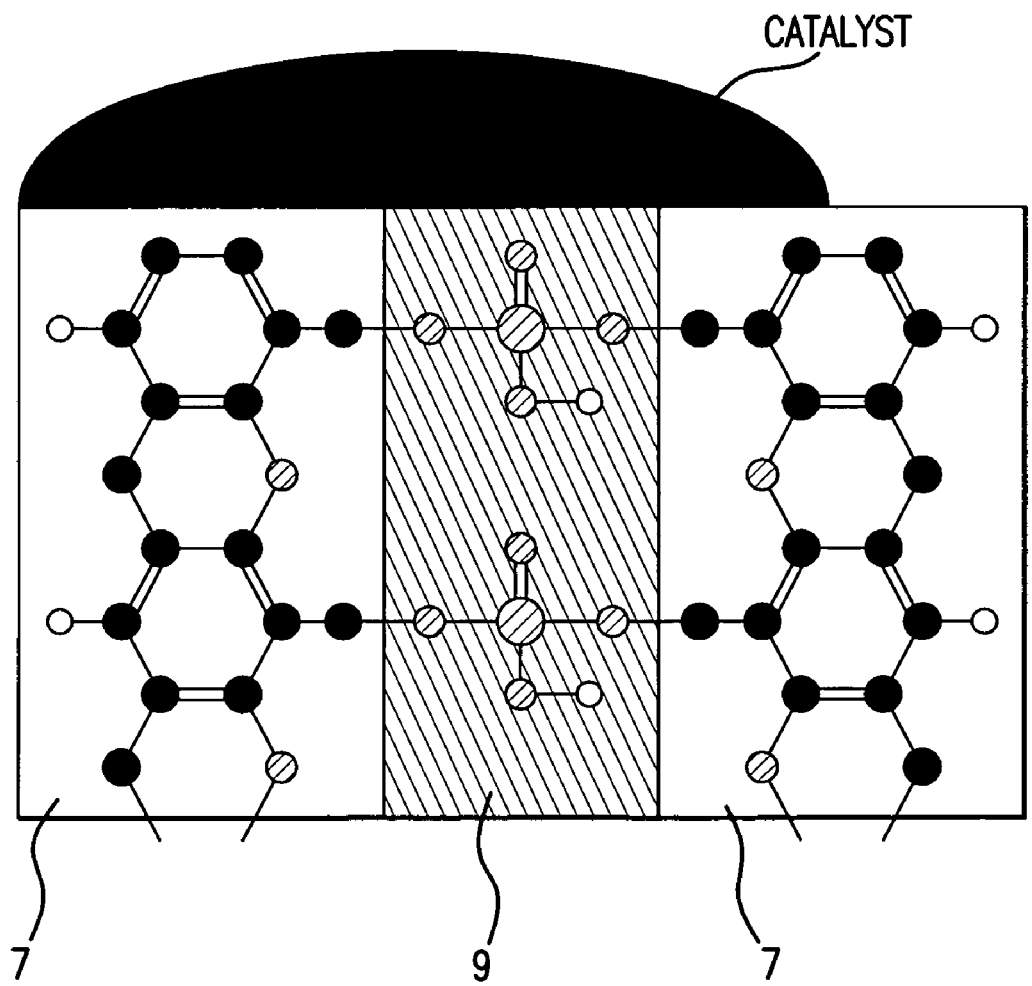
FIG. 3 is a schematic representation of the structure of yet another mixed conductor according to the present invention.

This precursor is subjected to pyrolysis (at 500 to 1000° C.) under a nitrogen atmosphere to obtain a mixed conductor wherein electron conductor phases 7 of a graphite-like structure and a proton conductor phase 9 containing phosphoric acid groups are alternately aligned as shown in FIG. 3.

The mixed conductor thus obtained is ground, pressed into a plate, placed between current collecting plates and supplied with a DC current. Specific resistance of each embodiment is obtained from a voltage at room temperature.

|  | Example 1 | Example 2 | Example 3 |
|---|---|---|---|
| Heat treatment temperature | 500° C. | 800° C. | 1000° C. |
| Specific resistance (Ω cm) | 138 | 0.35 | 0.13 |

The high specific resistance for the sample heat-treated at a temperature of 500° C. is considered to be due to insufficient carbonization of the organic material.

The heating temperature and heating time are parameters that can be appropriately selected according to the structure and the like of the organic compound.

Next, a proton conduction test will be described with reference to FIGS. 4 and 5.

Figure 4:
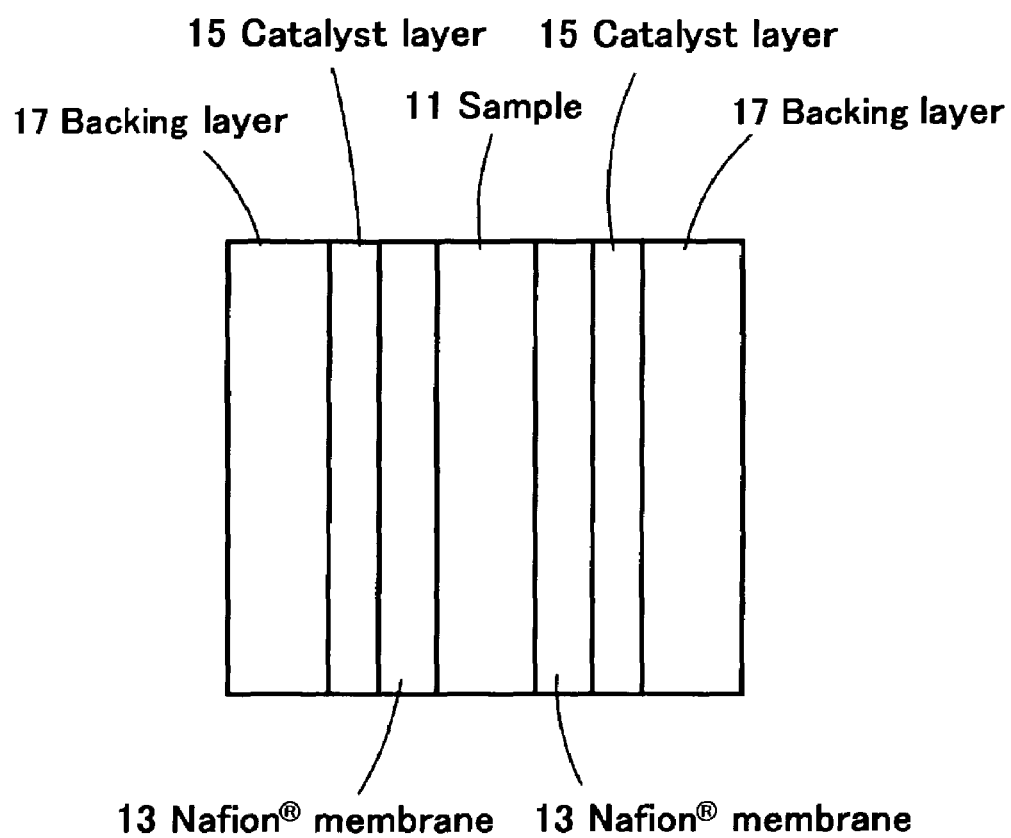
FIG. 4 is a schematic view of an element for checking the proton conducting function of the mixed conductor of the invention.

As shown in FIG. 4, a backing layer 17 consisting of a carbon cloth and catalyst layer 15 is attached to each side of a sample 11 in each of Examples 1 to 3. A Nafion membrane 13 transmits protons but blocks electrons.

A holder shown in FIG. 4 is put in a container, and nitrogen gas or hydrogen gas at a temperature of 60° C. and a relative humidity of 100% is introduced into the container. The voltage-current characteristic at that time is shown in FIG. 5.

Figure 5:
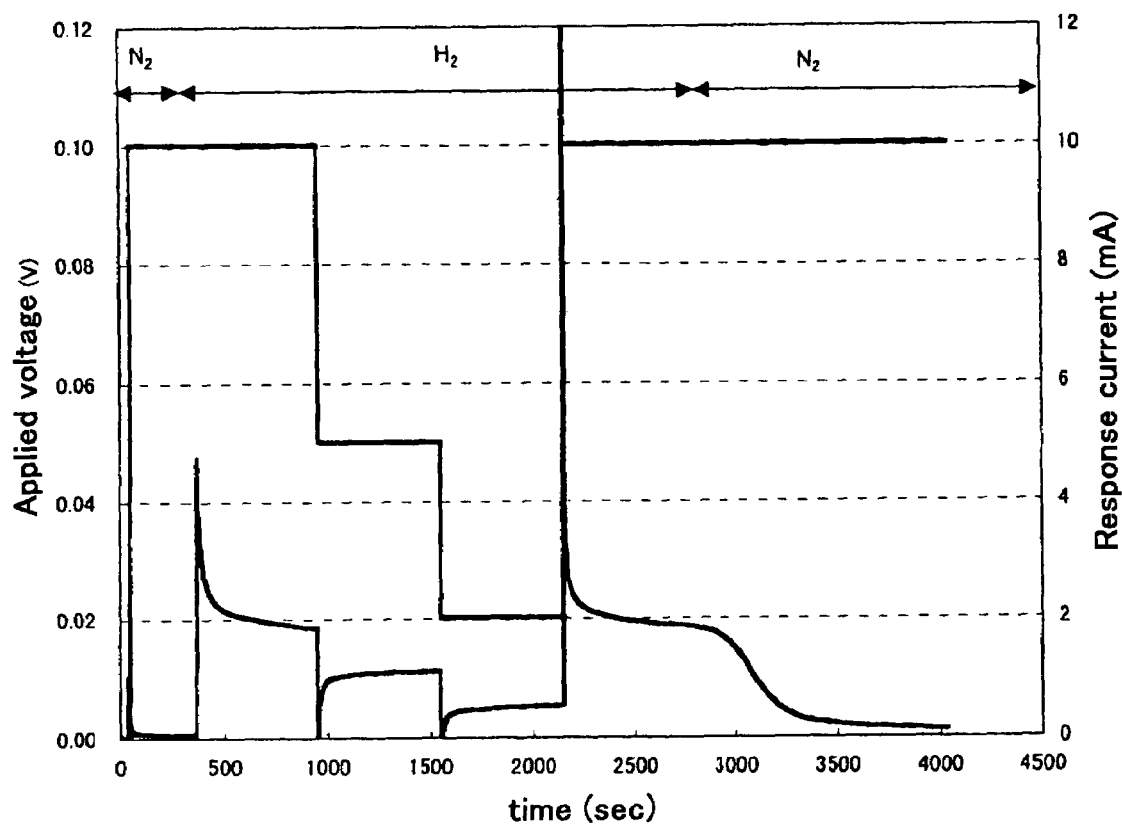
FIG. 5 is a chart showing the current-voltage characteristics of the element shown in FIG. 4.

As can be seen from FIG. 5, even if a voltage is supplied between the backing layers 17 while introducing the nitrogen gas, no current is carried. On the other hand, if hydrogen gas is introduced into the container, it can be seen that a current flows. This demonstrates that the sample 11 has proton conduction.

Further, the proton conductivity of each sample is calculated as follows.

|  | Example 1 | Example 2 | Example 3 |
|---|---|---|---|
| Heat treatment temperature | 500° C. | 800° C. | 1000° C. |
| Proton conductivity (S/cm) | $2.6 \times 10^{-3}$ | $1.3 \times 10^{-3}$ | $7.3 \times 10^{-4}$ |

Further, as comparative examples, the proton conductivities of samples similarly subjected to a heat treatment by the method described above, but with omission of addition of trimethyl phosphate, were calculated as follows.

|  | Comparative Example 1 | Comparative Example 2 | Comparative Example 3 |
|---|---|---|---|
| Heat treatment temperature | 500° C. | 800° C. | 1000° C. |
| Proton conductivity (S/cm) | $1.0 \times 10^{-6}$ or less | $1.0 \times 10^{-6}$ or less | $1.0 \times 10^{-6}$ or less |

A comparision of the samples to which trimethyl phosphate was added with those to which trimethyl phosphate was not added, confirms the proton conduction by phosphorus.

Figure 6:
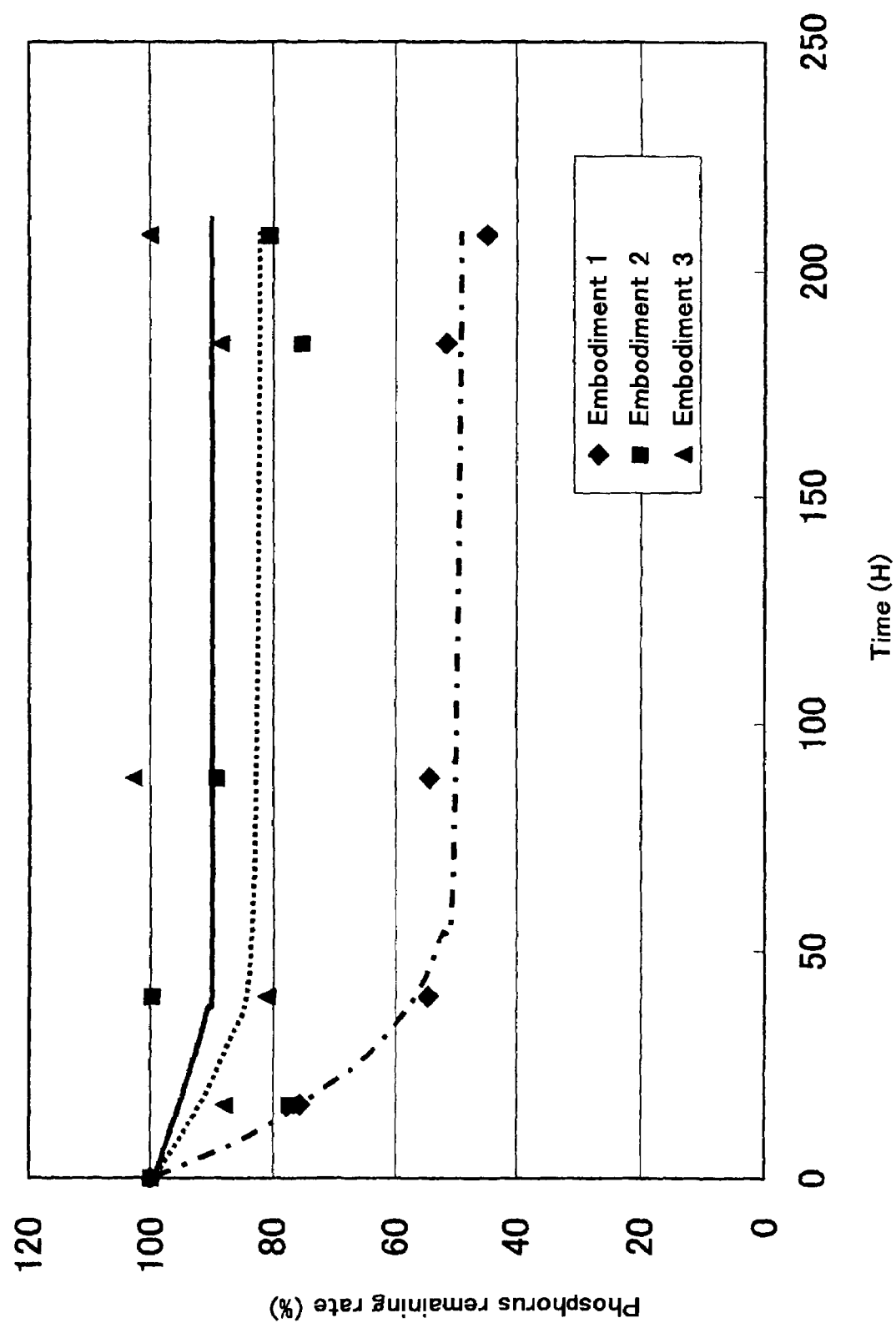
FIG. 6 is a chart showing the change in phosphoric acid content with time in the mixed conductor immersed in pure water.

The relationship between immersion time and remaining phosphorus content when samples (0.1 g) of the respective examples are immersed in 1000 cc of pure water at room temperature is shown in FIG. 6.

In FIG. 6, the phosphorus residual amount was measured by an EDX analyzer.

The result shown in FIG. 6 confirms that about 60% of phosphorus, about 80% of phosphorus, and about 90% of phosphorus (i.e., proton conduction) remains in the samples of Examples 1, 2, and 3, respectively, which demonstrates that the mixed conductors of the invention retain their proton conducting function even in a humid environment for a long time.

The mixed conductors can be used for fuel cells, and are particularly suitable for use as the catalyst layers of fuel cells. The catalyst layer is at a location where oxygen or hydrogen supplied from the outside through the backing layers is ionized, and is normally arranged between the proton exchange membrane and the backing layer.

Examples of a method for producing a catalyst layer of the mixed conductors will next be described.

WORKING EXAMPLE 1

Each of the mixed conductors produced above is ground to powder by a ball mill or the like, and a platinum catalyst is supported on the mixed conductor thus ground. The platinum catalyst can be supported on the mixed conductor by the same method as used to form a carbon supported platinum catalyst used as the catalyst layer of an ordinary fuel cell. For example, chloroplatinic acid solution is impregnated with the mixed conductor powder and then subjected to a reducing treatment, thereby forming the mixed conductor supported platinum catalyst.

The supporting mixed conductor is added to a Nafion solution, and mixed to produce a paste of the mixture thereof, and this paste is screen-printed on each surface of an proton exchange membrane (a Nafion membrane in this example). As a result, a catalyst layer containing the mixed conductor is formed. Further, a backing layer is attached to the outside of the catalyst layer, whereby a unit of fuel cell, i.e., a unit cell, is produced.

WORKING EXAMPLE 2

Each of the mixed conductors produced above is ground to powder by a ball mill or the like, and a platinum catalyst is supported on the mixed conductor thus ground.

Next, the powder of the mixed conductor which supports the catalyst is subjected to hot pressing, thereby forming the mixed conductor into a shape corresponding to a target electrode to produce a catalyst layer. This catalyst layer is superposed on the proton exchange membrane and the whole is hot pressed, whereby an integral structure having the proton exchange membrane between the catalyst layers is produced.

By attaching a backing layer to the outside of the catalyst layer, a unit cell of a fuel cell is produced.

In the tests described above, the mixed conductors of the examples exhibit both proton conduction and electron conduction at a low temperatures in a range of from room temperature to 60° C. Depending on the presence of water, the mixed conductors exhibit equivalent functions up to 200° C. in the atmosphere.

It is seen that the mixed conductors of the present invention exhibit their functions even at an extremely low temperature as compared with the conventional inorganic-based mixed conductor which exhibits its functions at a high temperature of about 800° C. Furthermore, as is obvious from the structure shown in FIG. 3, the electron conductor phase 7 is connected to the proton conductor phase 9 by a covalent bond, so that they are quite proximate to each other. Due to this, even if a catalyst particle is very small, the electron conductor 7 and the proton conductor 9 can always be brought into contact with the catalyst particles simultaneously. This makes it possible to supply electrons and protons necessary for a catalytic reaction to the catalyst in proper quantities and thereby improves catalyst utilization efficiency.

The present invention is not limited by the above description of the embodiments. The present invention also includes various changes and modifications thereto without departure from the description of claims which follow, in a range that can be easily attained by a person having the ordinary level of skill in the art.

What is claimed is:

1. A mixed conductor in the form of a single material comprising an electron conductor portion made of an inorganic material and a proton conductor portion made of an inorganic material, said electron conductor portion and said proton conductor portion being fixed together by at least one of covalent bonding, intercalation and inclusion so as not to dissolve in water.

2. The mixed conductor in the form of a single material according to claim 1, wherein said electron conductor portion is obtained by carbonizing at least one organic compound selected from the group consisting of aliphatic hydrocarbons, aromatic hydrocarbons and derivatives of aliphatic hydrocarbons and aromatic hydrocarbons.

3. The mixed conductor in the form of a single material according to claim 1, wherein said electron conductor portion is a carbonaceous material selected from the group consisting of graphite and carbon nanotubes.

4. The mixed conductor in the form of a single material according to claim 1, wherein said proton conductor portion contains at least one member selected from the group consisting of phosphorus-containing compounds, sulfur-containing compounds, carboxylic acids, and inorganic solid-state acids.

5. The mixed conductor in the form of a single material according to claim 1, wherein the electron conductor portion is fixed to the proton conductor portion by a covalent bond.

6. The mixed conductor in the form of a single material according to claim 1, wherein said electron conductor portion has consecutive carbon—carbon bonds including a carbon—carbon double bond.

7. The mixed conductor in the form of a single material according to claim 1, wherein said electron conductor portion is obtained by carbonizing an organic compound having one of or both of a carbon—carbon double bond and a carbon—carbon triple bond.

8. The mixed conductor in the form of a single material according to claim 1 wherein said electron conductor portion is selected from the group consisting of carbonaceous materials, gold, palladium, platinum, magnesium, lithium, titanium, and alloys thereof; and the proton conductor portion is made of at least one member selected from the group consisting of carbonic acid, boric acid, phosphoric acid, phosphoric acid esters, sulfuric acid, sulfuric acid esters, tungsten oxide hydroxide, rhenium oxide hydroxide, silicon oxide, tin oxide, zirconium oxide, tungstophosphoric acid, and tungstosilicic acid.

9. The mixed conductor in the form of a single material according to claim 8 wherein said electron conductor portion is a carbonaceous material.

10. The mixed conductor in the form of a single material according to claim 8 wherein said electron conductor portion is selected from the group consisting of carbonaceous materials, gold, palladium, platinum, magnesium, lithium, titanium, and alloys thereof; and the proton conductor portion is made of at least one member selected from the group consisting of carbonic acid, boric acid, phosphoric acid, phosphoric acid esters, sulfuric acid, sulfuric acid esters, tungsten oxide hydroxide, rhenium oxide hydroxide, silicon oxide, tin oxide, zirconium oxide, tungstophosphoric acid, and tungstosilicic acid.

11. The mixed conductor in the form of a single material according to claim 10 wherein said electron conductor portion is a carbonaceous material.

12. The mixed conductor in the form of a single material according to claim 11 wherein said proton conductor portion is formed of phosphoric acid groups and said carbonaceous material has a graphite structure.

13. A mixed conductor in the form of a single material comprising an electron conductor portion and a proton conductor portion made of an inorganic material, said electron conductor portion and said proton conductor portion being fixed together by at least one of covalent bonding, intercalation and inclusion, and wherein said electron conductor portion is made of an inorganic material obtained by carbonizing an organic material.

14. The mixed conductor in the form of a single material according to claim 13 wherein said proton conductor portion is formed of phosphoric acid groups and said carbonaceous material has a graphite structure.

15. The mixed conductor in the form of a single material according to claim 13 wherein said proton conductor portion is at least one member selected from the group consisting of phosphoric acid, phosphates, sulfuric acid, sulfates, tungsten oxide hydroxide, rhenium oxide hydroxide, silicon oxide, tin oxide, zirconium oxide, tungstophosphoric acid, and tungstosilicic acid.

16. The mixed conductor in the form of a single material according to claim 15 wherein said electron conductor portion has a graphite structure.

17. A method for producing a mixed conductor in the form of a single material comprising:
   a first step of obtaining a high molecular precursor by polymerizing an organic compound having one of or both of a carbon—carbon double bond and a carbon—carbon triple bond with a proton conducting material; and
   a second step of pyrolyzing the precursor obtained in the first step in an inert atmosphere.

18. The mixed conductor producing method according to claim 17, wherein the organic compound having one of or both of the carbon—carbon double bond and the carbon—carbon triple bond is an aliphatic hydrocarbon or an aromatic hydrocarbon.

19. The mixed conductor producing method according to claim 18, wherein said organic compound is at least one member selected from the group consisting of polyacetylene, resorcinol, phenol, phenylphenol, polyaniline, polypyrrole, polythiophene, phenylphosphonic acid, and phenylsilane alkoxide.

20. The mixed conductor producing method according to claim 17, wherein said proton conducting material is at least one member selected from the group consisting of phosphoric acid, phosphates, sulfuric acid, sulfates, tungsten oxide hydroxide, rhenium oxide hydroxide, silicon oxide, tin oxide, zirconium oxide, tungstophosphoric acid, and tungstosilicic acid.

21. The mixed conductor producing method according to claim 17, comprising a third step of causing the precursor burned in the second step to support a noble metal catalyst.

22. A method for producing a mixed conductor in the form of a single material comprising:
   a first step of obtaining a high molecular precursor by dispersing a proton conducting material into an organic compound polymer having one of or both of a carbon—carbon double bond and a carbon—carbon triple bond; and
   a second step of pyrolyzing the precursor obtained in the first step in an inert atmosphere.

23. A mixed conductor producing method wherein an organic compound having a π bond is dehydration-condensation polymerized and bound with a compound having movable protons to obtain a precursor having proton conduction, and energy is applied to said precursor under an inert gas atmosphere to thereby impart electron conduction to the precursor.

24. A mixed conductor in the form of a single material comprising an electron conductor portion made of an inorganic material and a proton conductor portion made of an inorganic material, said electron conductor portion and said proton conductor portion being fixed together to form a catalyst support which does not dissolve in water and a noble metal catalyst supported on said catalyst.

25. A mixed conductor in the form of a single material comprising an electron conductor portion made of an inorganic material obtained by carbonizing an inorganic material and a proton conductor portion made of an inorganic material, said electron conductor portion and said proton conductor portion being fixed together to form a catalyst support insoluble which does not dissolve in water and a noble metal catalyst supported on said catalyst support.

26. The mixed conductor in the form of a single material according to claim 25 wherein said proton conductor portion is at least one member selected from the group consisting of phosphoric acid, phosphates, sulfuric acid, sulfates, tungsten oxide hydroxide, rhenium oxide hydroxide, silicon oxide, tin oxide, zirconium oxide, tungstophosphoric acid, and tungstosilicic acid.

27. The mixed conductor in the form of a single material according to claim 26 wherein said electron conductor portion has a graphite structure.

28. A mixed conductor in the form of a single material comprising an electron conductor portion made of an inorganic material and a proton conductor portion made of an inorganic material, said electron conductor portion and said proton conductor portion being fixed together by intercalation so as not to dissolve in water.

29. A mixed conductor in the form of a single material comprising an electron conductor portion made of an inorganic material and a proton conductor portion made of an inorganic material, said electron conductor portion and said proton conductor portion being fixed together by inclusion so as not to dissolve in water.

* * * * *

UNITED STATES PATENT AND TRADEMARK OFFICE
CERTIFICATE OF CORRECTION

| | |
|---|---|
| PATENT NO. | : 7,160,837 B2 |
| APPLICATION NO. | : 10/667974 |
| DATED | : January 9, 2007 |
| INVENTOR(S) | : Norifumi Hasegawa |

It is certified that error appears in the above-identified patent and that said Letters Patent is hereby corrected as shown below:

Column 8, line 41 (claim 10, line 2), "8" should read -- 13 --; and

Colum 10, line 25 (claim 25, line 7), delete "insoluble".

Signed and Sealed this

Sixteenth Day of October, 2007

JON W. DUDAS
*Director of the United States Patent and Trademark Office*